UNITED STATES PATENT OFFICE.

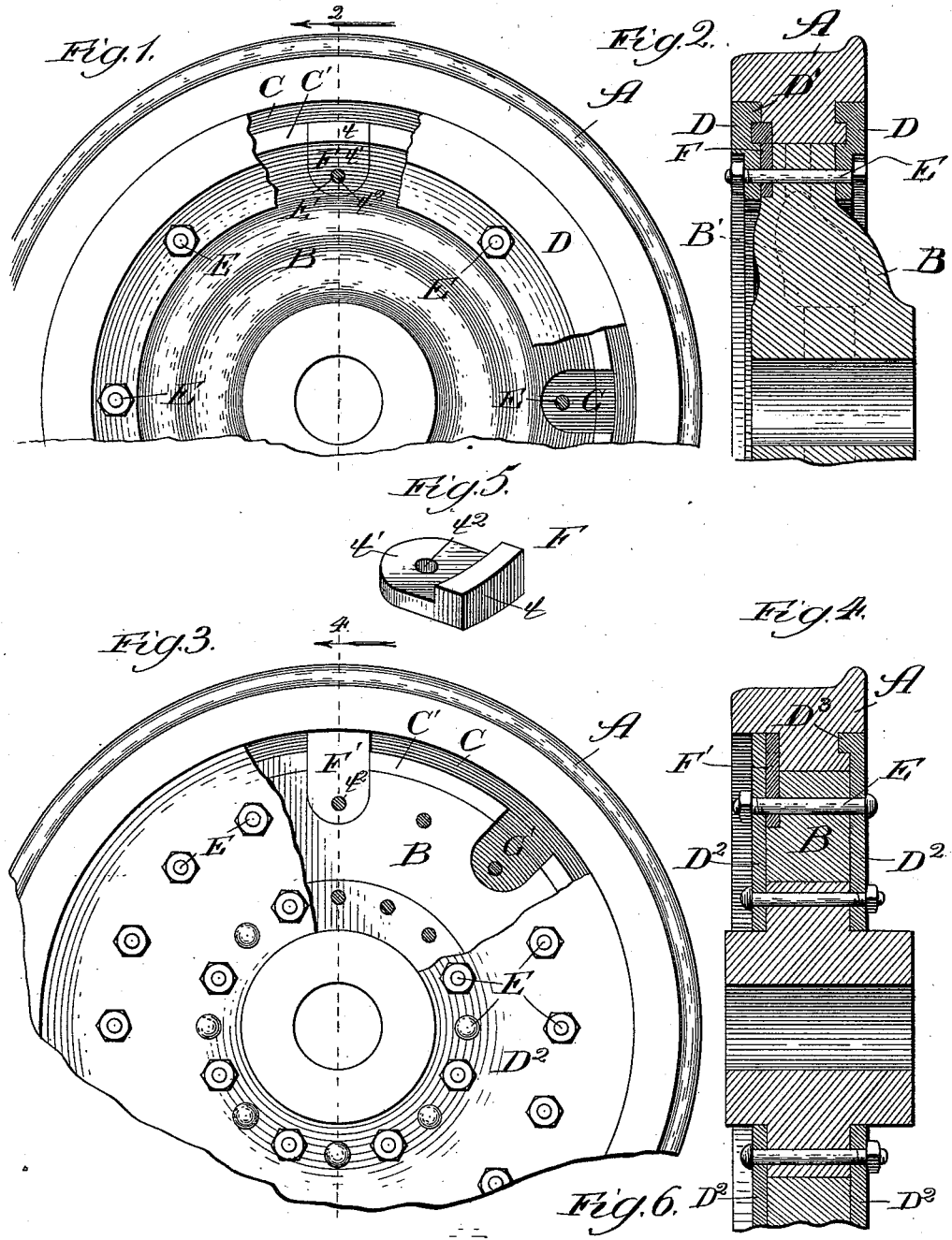

JOHN R. DAVIES, OF WOODLAWN PARK, ILLINOIS.

CAR-WHEEL.

SPECIFICATION forming part of Letters Patent No. 465,245, dated December 15, 1891.

Application filed July 18, 1891. Serial No. 399,899. (No model.)

*To all whom it may concern:*

Be it known that I, JOHN R. DAVIES, a citizen of the United States, residing at Woodlawn Park, in the county of Cook and State of Illinois, have invented a new and useful Improvement in Car-Wheels, of which the following is a specification.

My invention relates to car-wheels, and more particularly to car-wheels in which the tire and center are made in separable parts; and the object of my invention is to improve the construction of these wheels to prevent independent movement between the tire and center under any conditions.

With the construction of car-wheel now most generally in use on railway-cars the center is made of paper or cast-iron in the form of spokes, disks, or a hollow circular body. The tire is shrunk upon the center thus made and secured by bolts and flanged rings, the annular flange upon which enters an annular recess formed in the tire. Substantially the same construction is employed whether the center be made of cast-iron or of paper, and the same objection is found to the construction in both instances. The tire, being of steel, expands more freely under heat than the center, which when made of paper does not expand at all. The binding-ring which holds the tire to the center is also of steel and expands and contracts with the tire. It is found, therefore, that when the tire becomes heated by friction upon the rails it has a larger internal diameter than the external diameter of the center, so that when the brake is applied a check is exerted upon the revolution of the tire, which is not felt or at least is felt to a much less degree by the center, the difference between the movements of the tire and center serving in a very short time to shear the bolts which afford the means of securing the parts together.

The purpose of my invention is primarily to provide a means for joining the tire and center, which will prevent the independent rotation of these parts, and in this manner relieve the strain upon the bolts, while at the same time making the wheel respond at all times readily to the action of the brake. By preventing independent movement of the tire and center a part of the friction is avoided, thus prolonging the life of the wheel to a very considerable extent.

To the foregoing ends my invention consists in a wheel in which the tire and center are made in separable parts and provided with locking-keys, one or more in number, embedded in or otherwise engaging contiguous parts of the center and tire in the manner hereinafter described.

My invention consists, further, in a car-wheel in which the center is of paper and the tire of metal shrunk upon the center and provided with locking-keys, one or more in number, embedded in or otherwise engaging the center and tire and held in place by a flanged disk properly recessed to receive the locking-keys.

In the drawings, Figure 1 is a view in broken elevation of a car-wheel having a cast-iron center and constructed in accordance with my invention. Fig. 2 is a vertical section taken on the line 2 of Fig. 1 and viewed in the direction of the arrow. Fig. 3 is a view in broken elevation of a car-wheel having a paper center and constructed in accordance with my invention. Fig. 4 is a vertical section on the line 4 of Fig. 3 and viewed in the direction of the arrow. Fig. 5 is a perspective view of the locking-key in the form adapted for use with the car-wheel illustrated in Fig. 1, and Fig. 6 is a perspective view of a section of the disk shown in Fig. 3 for holding the locking-key against withdrawal.

A represents the tire, and B the center, of a car-wheel, the center shown in Figs. 1 and 2 being of cast metal, presenting the interior space B', while the form shown in Figs. 3 and 4 is of paper and of the kind generally known as the "Allen paper car-wheel center." The tire A is shrunk upon the center B, and to hold it against lateral displacement an annular groove C and flange C' are formed on the tire, and a retaining-ring D, having an inwardly-extending flange D', is adjusted in the groove C and bolted to the center B through the medium of bolts E. In the case of the paper car-wheel it is generally preferred to extend the ring D into a disk D², provided with the peripheral inwardly-extending flange H to enter the recess C and bolted to the center through the medium of bolts E, as before. As so far described the construction is that commonly in use.

To prevent independent rotation of the tire and center under the operation of the causes above mentioned, I introduce locking-keys F F', for the reception of which a recess is cut in the flange C' of the tire and a recess corresponding to the outline of the inner end of the key is cut in the center near the periphery.

In the case of the wheel illustrated in Fig. 1 I find it desirable, owing to the reduced thickness of the center at the point of connection with the tire, to cut the recess through the flange C' only and not into the bottom of the recess C and to cut the recess in the center B somewhat deeper than the depth of the flange C'. In this case, also, I form the locking-key F as illustrated in Fig. 5—namely, with the flanged outer edge $t$ and reduced inner part $t'$, the latter being perforated, as shown at $t^2$, for the reception of one of the bolts E.

The manner of forming the recess for the reception of the locking-plate F is illustrated at G, Fig. 1.

In the case of the paper car-wheel, (illustrated in Fig. 3,) in which usually the center is flush with the flange C', I prefer to form the locking-key F' of a plate of metal of uniform thickness—that is to say, about the thickness of the flange C'—and to cut the recess in the center and through the flange C' to a depth equal to the thickness of the latter. The key F' is provided with a bolt-hole $t^2$ for the reception of one of the bolts E after the disk $D^2$ has been applied over the center. As in the construction of this form of wheel a means for retaining the tire against lateral displacement is also desirable, I effect the result by forming on the disk $D^2$ a peripheral inward-extending flange H, cut away, as indicated at H', to receive the locking-key F'.

By my construction, whether applied to one or the other form of wheel, independent movement of the tire and center is impossible, and the strain which a tendency to such independent movement may exert is distributed throughout the length of the locking-key introduced. In practice I prefer about eight of such keys; but the number may be increased or reduced, as may be deemed desirable, without departing from my invention. The form of the locking-key, although apparently most economical when made in the form shown, is not material; nor is it essential that recesses shall be formed in the center and in the tire to receive the locking-keys. In place of the recess any other means of affording a check against the lateral displacement of the key may be substituted without departing from my invention, and instead of the ring D or disk $D^2$ any other satisfactory means to prevent the key from unintentional withdrawal may be substituted.

My invention is to be understood as in no sense limited to specific details of construction, except so far as express limitation may be contained in the claims which follow.

What I claim as new, and desire to secure by Letters Patent, is—

1. A car-wheel comprising, in combination, a tire provided with a recessed flange C', center B, a locking-key in the recess in the flange, and a bolt holding the key to the center, substantially as described.

2. A car-wheel comprising, in combination, a tire A, having a flange C', center B, said tire and flange C' and center being provided with contiguous recesses G, a locking-key inserted in and filling the recesses G, and bolt E, holding the locking-key in position, substantially as described.

3. A car-wheel comprising, in combination, center B, having recesses at the periphery, tire A, having flange C', recessed at points contiguous to the recesses in the center B, locking-keys set in said recesses, and disk $D^2$, having recessed peripheral flange H, the parts being constructed and arranged to operate substantially as described.

JNO. R. DAVIES.

In presence of—
ARTHUR DYRENFORTH,
M. J. FROST.